(12) United States Patent
Reisch et al.

(10) Patent No.: US 8,794,415 B2
(45) Date of Patent: Aug. 5, 2014

(54) POSITIVELY ENGAGING SHIFTING ELEMENT WHICH CAN BE HYDRAULICALLY OR PNEUMATICALLY ACTUATED

(75) Inventors: Matthias Reisch, Ravensburg (DE); Ralf Dreibholz, Meckenbeuren (DE); Gerhard Gumpoltsberger, Friedrichshafen (DE); Peter Ziemer, Tettnang (DE); Mark Mohr, Tettnang (DE); Manuel Götz, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 502 days.

(21) Appl. No.: 12/988,247

(22) PCT Filed: Mar. 24, 2009

(86) PCT No.: PCT/EP2009/053431
§ 371 (c)(1),
(2), (4) Date: Nov. 30, 2010

(87) PCT Pub. No.: WO2009/127499
PCT Pub. Date: Oct. 22, 2009

(65) Prior Publication Data
US 2011/0099994 A1 May 5, 2011

(30) Foreign Application Priority Data

Apr. 16, 2008 (DE) .......................... 10 2008 001 196

(51) Int. Cl.
*F16D 25/061* (2006.01)
(52) U.S. Cl.
USPC ..................................... 192/85.18; 192/85.41
(58) Field of Classification Search
USPC ....................................................... 192/85.18
See application file for complete search history.

(56) References Cited

U.S. PATENT DOCUMENTS 4,293,061 A 10/1981 Brown
5,366,053 A * 11/1994 Yant ........................... 192/219.2
(Continued)

FOREIGN PATENT DOCUMENTS

DE 10244023 A1 4/2004
FR 2464163 A1 3/1981
JP H5-263837 A 10/1993

OTHER PUBLICATIONS

International Search Report for International Application No. PCT/EP2009/053431, dated Jul. 17, 2009, 2 pages.
(Continued)

*Primary Examiner* — David D Le
*Assistant Examiner* — Ryan Dodd
(74) *Attorney, Agent, or Firm* — Brinks Gilson & Lione

(57) ABSTRACT

The invention relates to a positively engaging shifting element which can be hydraulically or pneumatically actuated, comprising a hydraulically or pneumatically actuatable piston (I) having a piston compartment (2) containing a hydraulic medium or pressure medium, a pressure medium supply (6) for the piston (I), a jaw (3) and a mating jaw (4) with which the jaw (3) meshes when engaged. The engaging speed of the jaw (3) can be increased by decoupling the jaw (3) from the hydraulic or pneumatic volume flow when the jaws (3) and (4) are in a tooth butt position in relation to each other and by pretensioning the jaw (3) by means of a hydraulic or pneumatic pressure reservoir (7) that is actively connected to the piston (I) and that is connected to the pressure medium supply (6). The gap between the jaws, i.e. the window into which the jaw (3) can be engaged is maintained as narrow as possible in order for a tooth butt position of the jaws (3) and (4) in relation to each other being highly probable when the shift element is applied.

12 Claims, 2 Drawing Sheets

(56) References Cited

U.S. PATENT DOCUMENTS

Figure 1:
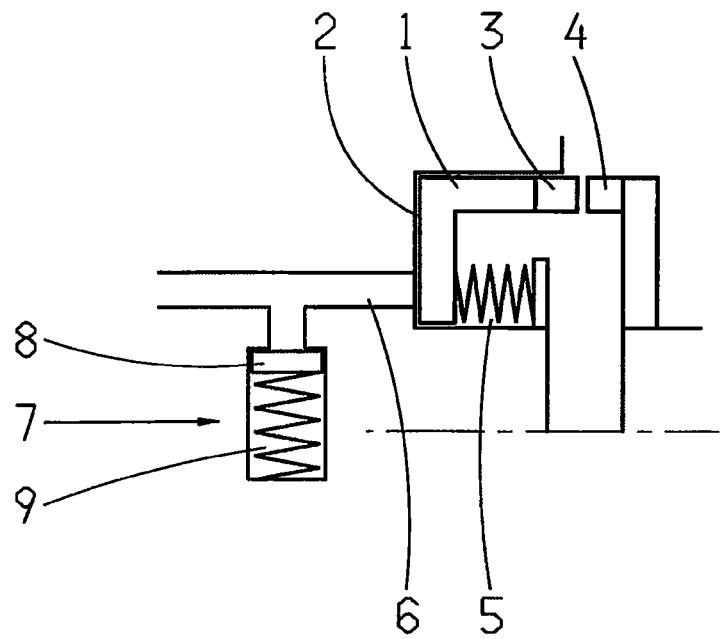

| | | | |
|---|---|---|---|
| 5,950,785 | A | 9/1999 | Adachi et al. |
| 6,889,811 | B2 * | 5/2005 | Ebert et al. ............... 192/48.618 |
| 6,962,549 | B2 | 11/2005 | Dreibholz et al. |
| 7,594,869 | B2 * | 9/2009 | Holmes ............................. 475/5 |
| 8,132,638 | B2 * | 3/2012 | Martus et al. ................. 180/247 |
| 2007/0295575 | A1 | 12/2007 | Turner |

OTHER PUBLICATIONS

Translation of International Preliminary Report on Patentability for International Application No. PCT/EP2009/053431, dated Jan. 5, 2011, 6 pages.

English translation of third Chinese Office Action issued in Chinese Application No. 200980105098.4 by the SIPO on Oct. 23, 2013.

* cited by examiner

POSITIVELY ENGAGING SHIFTING ELEMENT WHICH CAN BE HYDRAULICALLY OR PNEUMATICALLY ACTUATED This application is a filing under 35 U.S.C. §371 of International Patent Application PCT/EP2009/053431, filed Mar. 24, 2009, which claims priority to German Application No. 10 2008 001 196.7, filed Apr. 16, 2008, each of which is hereby incorporated by reference herein in its entirety.

The present invention concerns a form-fit control element to be activated in a hydraulic or pneumatic manner according to the preamble of claim 1.

In particular, the invention concerns a form-fit control element to be activated in hydraulic or pneumatic manner and to be used for a load-shiftable automatic transmission, preferably for an automatic transmission in planetary gear design, countershaft gear design or mixed construction, or for a continuously variable transmission having a plurality of regions, for example, for a hydrostatic, mechanical or electrical multi-range transmission.

Load-shiftable automatic transmissions usually provide hydraulically activated lamellar switching elements. These transmissions are compressed and thus operated by means of a hydraulically activated piston in which a hydraulic control device controls the pressure. By specifically adjusting the actuating force and, consequently, the friction moment, it is possible to produce a load circuit without traction force at a differential speed.

It is of disadvantage that the short distance between the friction surfaces and the contained oil or air and oil mixture produces a drag torque in these lamellar switching elements when they are in an open state.

Form-fit control elements or jaw clutches and jaw brakes are known to be used in several other motor vehicle and especially transmission applications. For example, such control elements are used in automated intermediate gearboxes or in switchable lateral or transverse differential locks. In these applications, the control elements can usually be activated in a pneumatic or electro-mechanical manner.

In certain constructions it is possible to substitute lamellar switching elements with form-fit control elements. This involves control elements which only switch off during upshifting, or control elements which engage only in reverse gear.

For example, the applicant disclosed such a transmission in DE 10244023 A1. The document proposes an automatic transmission comprising of several control elements and several gears, which can be switched to power flow by means of the control element, and in which at least one of the control elements, respectively, has to be closed for the purpose of adjusting the transmission ratio.

In this known transmission, the control elements that are activated during an upshift are designed as friction-locked control elements, whereas the control elements which during an upshift represent only a de-activated control element are designed as a form-fit jaw-shaped control element. According to DE 10244023 A1, the form-fit control elements can be designed in such a way that they can be activated hydraulically or mechanically.

The use of form-fit control elements or jaws prevents to a large extent the drag torque. What is more, because of the form-fit transmission, jaws require lower actuation forces and less installation space than lamellar switching elements.

To activate hydraulically form-fit control elements or jaws within an automatic transmission using hydraulic control, it is especially advantageous that the already available hydraulic pressure can be used for appropriately activating the jaws.

If a jaw is directly connected to a piston of a hydraulic system, then the disadvantage results that a tooth butt position is affected by the sudden stop of the piston in the hydraulic system, especially in the case of repeated rejection. Furthermore, in the process of overcoming the tooth butt position, the insertion speed of the jaw could be too low to achieve in a sufficiently short period of time an adequate overlapping of the bearing flanks, because the displacement velocity of the jaws depends on the available volume flow and, consequently, on the pump dimensions and the channel cross-section, as well as on the piston surface.

There can also be situations in which at a certain differential speed there is not enough speed to mesh the jaw far enough into the gap in order to secure an adequate overlapping.

To solve the problem, it is possible to increase the jaw gap. Alternatively or additionally, it is also possible to change the bevel of the jaws. Increasing the jaw gap would also increase the motion gap in case a load shift takes place at the control element. This, in turn, has a negative effect on the driving comfort and noise development.

Changing the bevel of the jaws produces rejection forces which has the effect that the jaws must always be closed under pressure. Moreover, these axial forces have an unfavorable effect on the life and efficiency of the respective axial bearings.

The present invention is based on the objective of providing a form-fit control element that can be actuated in a hydraulic or pneumatic manner, which can be suitably used in a load-shiftable automatic transmission or in a continuously variable transmission and which is able to avoid the disadvantages known from prior art. One specific objective of the invention is to increase the engaging speed of the jaw of a control element and to guarantee adequate overlapping of the bearing flanks of the jaws.

This objective is achieved by means of the characteristics of claim 1. The dependent claims include further invention-based designs and advantages.

Accordingly, the invention proposes a form-fit control element that can be actuated in a hydraulic or pneumatic manner, which comprises a piston that can be actuated in a hydraulic or pneumatic manner. Said piston has a piston compartment containing the hydraulic medium or pressure medium, a jaw having jaw toothing and a mating jaw which the toothing meshes when engaged. The engaging speed of the jaw can be increased by decoupling the jaw from the hydraulic or pneumatic volume flow when the jaw and the mating jaw are in a tooth butt position in relation to each other and by pretensioning the jaw by means of a hydraulic or pneumatic pressure reservoir that is actively connected to the piston.

According to a further development of the invention, the jaw gap, i.e., the window, into which the jaw can be engaged is kept as narrow as possible in order that a tooth butt position of the jaws in relation to each other is highly probable when the shift element is applied. In the process, there is sufficient time in a defined speed window to feed an adequate volume flow and to store the resulting energy in the hydraulic or pneumatic pressure reservoir. According to the invention, if the jaw impinges a gap, the stored energy considerably accelerates the jaw, guaranteeing that the flanks of the jaws are adequately overlapping.

Preferably, the hydraulic or pneumatic pressure reservoir is situated near the piston of the control element and the piston of the control element is directly connected with the jaw. For example, the hydraulic or pneumatic pressure reservoir can be located in a housing of the control element, in a hydraulic oil or compressed air supply, or in the center of a rotating shaft.

Furthermore, an additional spring has been provided for pushing the jaw of the control element back (in case the control element is open when unpressured), or for engaging the jaw of the control element (in case the control element is closed when unpressured). In case the piston is hydraulically actuated said spring counteracts the piston.

Figure 2:
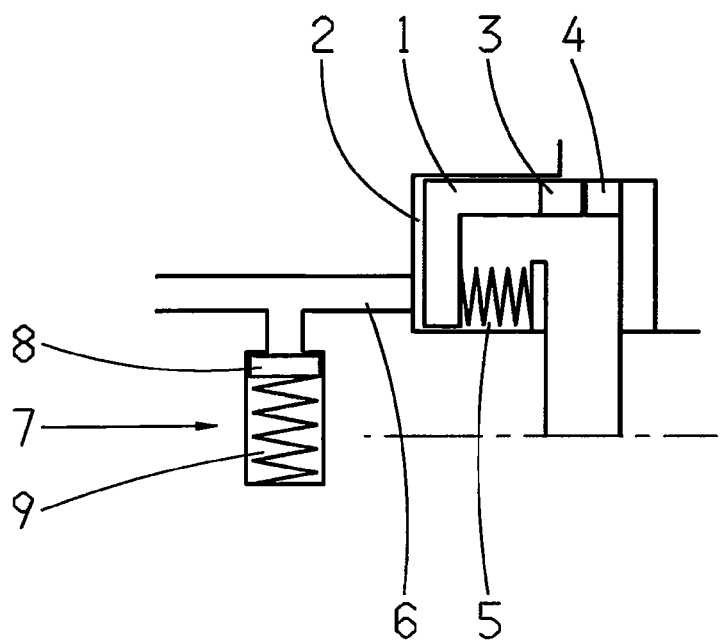
Figure 3:
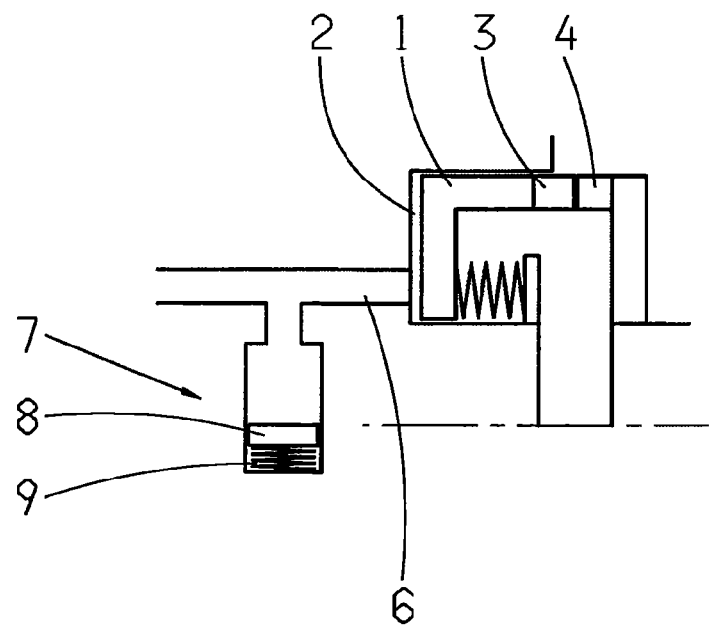

Subsequently, the invention is described in more detail by means of the enclosed exemplary figures. It is shown:

FIG. 1: A sectional view of a schematic diagram of a preferred embodiment of the invention-based form-fit control element in disengaged state;

FIG. 2: A sectional view of a schematic diagram of the invention-based embodiment of the form-fit control element shown in FIG. 1 in engaged state;

FIG. 3: A sectional view of a schematic diagram of the invention-based embodiment of the form-fit control element shown in FIG. 1 in pretensioned state; and FIG. 4: A sectional view of a schematic diagram of the invention-based embodiment of the form-fit control element shown in FIG. 1 in engaged state.

FIG. 1 shows an exemplary invention-based assembly of a form-fit control element that can be actuated hydraulically or pneumatically.

The control element comprises a hydraulically or pneumatically operable piston 1, which has a piston compartment 2 containing the hydraulic medium or pressure medium, a jaw 3 and a mating jaw 4 into which the jaw 3 meshes when engaged.

Furthermore, the control element comprises a disengaging spring 5 used for pushing the jaw 3 back (in case the control element is open when unpressured, which corresponds to the embodiment shown), or for engaging the jaw (in case the control element is closed when unpressured). The spring 5 counteracts the piston 1 if it is hydraulically or pneumatically actuated. In the case of a control element which is closed or engaged when unpressured (normally-closed arrangement), the piston compartment 2 and the spring 5 switch positions. In the example shown in FIG. 1, the control element is open when unpressured. Therefore, the spring 5 counteracts the piston 1 if it is moved to the right. It is preferred if the spring 5 acts directly on the piston 1.

In the context of a further embodiment (not shown), an additional pressure compartment has been provided instead of the spring 5, so that the process of pushing back the jaw 3 (in case the control element is open when unpressured) or engaging the jaw (in case the control element is closed when unpressured) takes place hydraulically by increasing the counter pressure actuating on the piston 1.

In the figure, numeral 6 depicts the pressure medium supply of the piston 1 which is connected with the piston compartment 2.

The invention provides a hydraulic or pneumatic pressure reservoir 7 which allows in a tooth butt position of the jaws 3 and 4 in relation to each other that the energy produced by the volume flow is stored. This energy is released if in a further rotation the jaw 3 impinges the gap of the mating jaw 4. Consequently, by means of the pressure reservoir, it is possible to maintain the volume flow when the jaws 3 and 4 are in a tooth butt position in relation to each other.

FIG. 1 shows that the pressure reservoir 7 has been designed as a piston accumulator and comprises an accumulator piston 8 and an accumulator spring 9. Through the volume flow, when the jaws 3 and 4 are in a tooth butt position in relation to each other and, consequently, when the piston is fixed (the piston 1 is directly connected to the jaw 3) the piston 8 is moved against the force of the spring. The energy is stored as spring energy and subsequently, when the piston 1 can be moved, which is the case if the jaw 3 impinges a gap of the mating jaw 4, it can be transferred to the piston 1 as hydraulic energy in order to close the control element.

According to the invention, it has also been arranged that the jaw gap is kept as small as possible so that in all probability a tooth butt position of the jaws 3 and 4 in relation to each other can be guaranteed when applying the control element.

FIG. 2 shows the invention-based control element shown in FIG. 1 in applied condition, in which the position of jaw 3 and mating jaw 4 in relation to each other corresponds to a tooth butt position. The spring 9 of the pressure reservoir is not pretensioned.

If the volume flow is maintained, the piston being in a tooth butt position cannot move further in the direction of maximum position (i.e., in the figures to the right) so that, as shown in FIG. 3, the spring 9 is compressed and pretensioned. In the example shown, the accumulator piston 8 is moved into maximum position.

Figure 4:
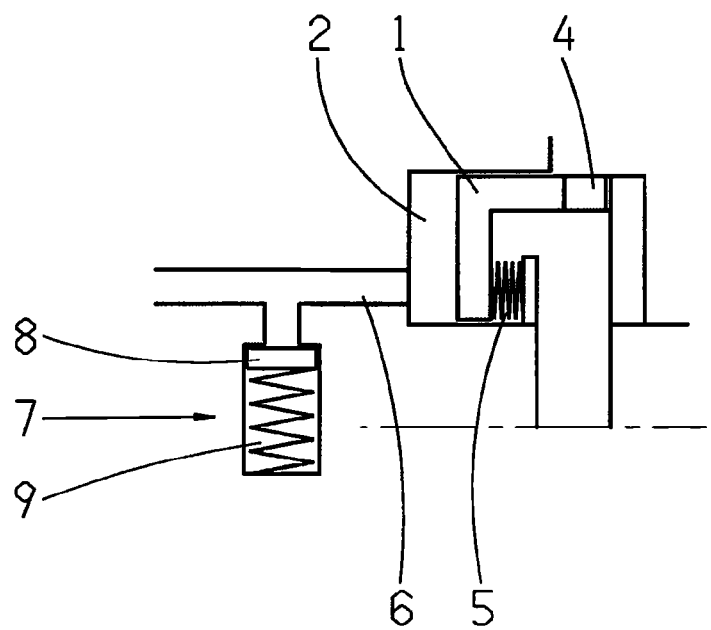

If, in a further rotation, the jaw 3 impinges a gap of the mating jaw 4, the piston 1 and thus the jaw 3 connected to the piston is considerably accelerated through the energy stored in the spring 9, which energy is transformed into hydraulic energy. As a result, the piston is quickly pushed in, which guarantees that the bearing flanks of the jaws of the control element are adequately overlapped. FIG. 4 shows the invention-based control element in compressed condition.

According to the invention, the spring 5 can be designed as an individual coil spring, a coil spring package, a disc spring, a disc spring package or any other mechanical spring. The pressure reservoir 7 can be designed as a hydraulic or pneumatic reservoir in the form of a coil spring accumulator with a piston or a disc spring accumulator with a piston, as a gas hydraulic accumulator or any other suitable hydraulic or pneumatic pressure reservoir.

Furthermore, it is possible to use as a pressure medium for actuating the piston 1 of the control element oil, air or any other suitable pressure medium.

The jaw toothing can be designed as axial jaws, as well as radial jaws, or any other form-fit devices suitable to be used for torque transmission. When used as a jaw clutch, i.e., when both sides are rotating, it is advantageous to provide an additional rotation balance which is situated, for example, in the compartment of the disengaging spring.

Naturally, any structural design, especially any spatial arrangement of the different components of the invention-based control element in themselves or in relation to each other, or any technically expedient arrangement, comes under the protection of the available claims, without affecting the function of the control element as described in the claims, even if these designs are not explicitly depicted in the figures or in the description.

REFERENCE NUMERALS 1 piston
2 piston compartment
3 jaw
4 mating jaw
5 spring
6 pressure medium supply
7 pressure reservoir
8 accumulator piston
9 accumulator spring

The invention claimed is:

1. A form-fit control element to be activated in hydraulic or pneumatic manner, comprising:
   a main piston hydraulically or pneumatically operable, having a piston compartment containing hydraulic medium or pneumatic medium,
   a pressure medium supply providing a volumetric flow to move the main piston,
   a first jaw and a second jaw into which the first jaw meshes when the first jaw and the second jaw engage,
   a hydraulic or pneumatic pressure reservoir that is connected to the main piston and the pressure medium supply,
   wherein the hydraulic or pneumatic pressure reservoir comprises
      an accumulator piston, and
      an accumulator spring connecting to the accumulator piston, and
   wherein the piston compartment connects to the piston accumulator and the pressure medium supply in parallel,
   wherein, when the first jaw and the second jaw are in a tooth butt position with respect to each other so that the main piston is unable to move by the volumetric flow out of the pressure medium supply, the accumulator piston is moved by the volumetric flow so that hydraulic energy from the pressure medium supply is stored in the piston accumulator as spring energy, and
   wherein, when the first jaw engages with the second jaw from the tooth butt position, the spring energy is transferred to the piston as hydraulic energy in order to accelerate closing of the form-fit control element, guaranteeing that a bearing flank of the first jaw and a bearing flank of the second jaw are adequately overlapping.

2. The form-fit control element according to claim 1, wherein a gap between the first jaw and the second jaw is maintained so that the tooth butt position of the jaws in relation to each other is highly probable.

3. The form-fit control element according to claim 1, wherein the accumulator spring is a coil spring.

4. The form-fit control element according to claim 1, further comprising a spring connecting to the first jaw to counteract the main piston when the main piston is hydraulically or pneumatically actuated,
   wherein the spring is configured to push back the first jaw when the form-fit control element is configured to stay open when no volumetric flow is provided by the pressure the medium supply; or
   the spring is configured to push the first jaw to the second jaw when the form-fit control element is configured to stay closed when no volumetric flow is provided by the pressure the medium supply.

5. The form-fit control element according to claim 4, wherein the spring connects directly on the piston.

6. The form-fit control element according to claim 4, wherein the spring is an individual coil spring, a coil spring package, a disc spring, or a disc spring package.

7. The form-fit control element according to claim 1, wherein the hydraulic or pneumatic pressure reservoir is situated near the main piston.

8. The form-fit control element according to claim 7, wherein the hydraulic or pneumatic pressure reservoir is located in a housing of the form-fit control element, in a hydraulic oil or compressed air supply, or in the center of a rotating shaft.

9. The form-fit control element according to claim 1, wherein the main piston is directly connected to the first jaw.

10. The form-fit control element according to claim 1, wherein jaw toothing of the first and second jaws is one of axial jaws and radial jaws.

11. The form-fit control element according to claim 4, further comprising a rotation balance in a compartment of the spring when both the first jaw and the second jaw are rotating.

12. The form-fit control element according to claim 1, wherein the accumulator spring is disc spring.

* * * * *